H. K. TARKINGTON.
CURTAIN FASTENER.
APPLICATION FILED JUNE 12, 1919.
1,338,883. Patented May 4, 1920.
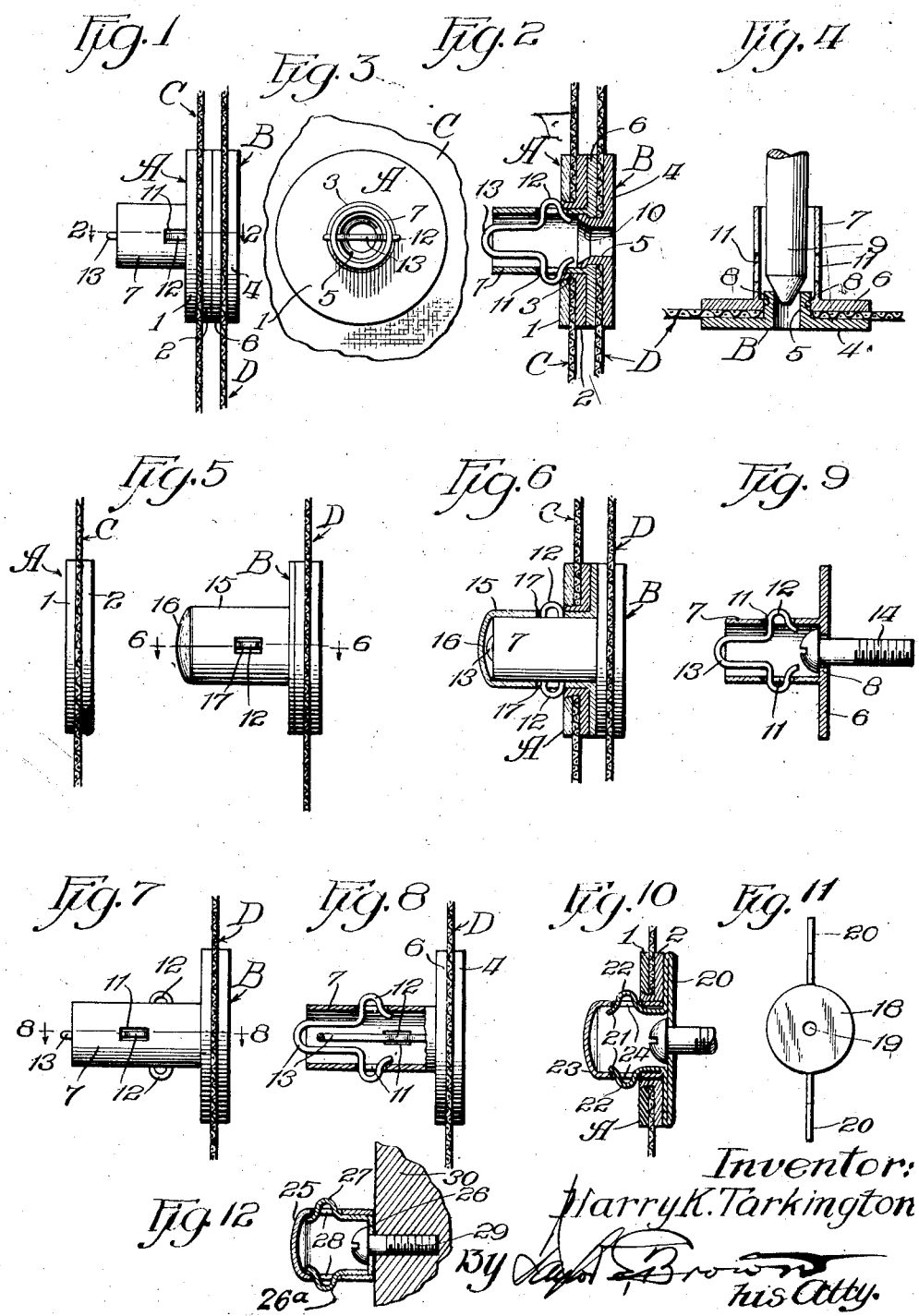
Inventor:
Harry K. Tarkington
By [signature] Brown
his Atty.

UNITED STATES PATENT OFFICE.

HARRY KERN TARKINGTON, OF CONNERSVILLE, INDIANA.

CURTAIN-FASTENER.

1,338,883.  Specification of Letters Patent.  Patented May 4, 1920.

Application filed June 12, 1919. Serial No. 303,606.

*To all whom it may concern:*

Be it known that I, HARRY K. TARKINGTON, a citizen of the United States, and a resident of Connersville, in the county of Fayette and State of Indiana, have invented certain new and useful Improvements in Curtain-Fasteners; and I do hereby declare that the following is a full, clear, and exact description thereof, reference being had to the accompanying drawings, and to the letters of reference marked thereon, which form a part of this specification.

This invention relates to fastening devices and more particularly to that class of fasteners used to secure the curtains on an automobile. The invention consists of the novel features of construction herein illustrated and described, and more particularly pointed out in the appended claims.

In the drawings:

Figure 1 illustrates in a side elevation a fastening device constructed in accordance with and embodying my invention.

Fig. 2 is a central, vertical, sectional view thereof, taken upon the plane indicated by the dotted line 2—2 of Fig. 1.

Fig. 3 is a plan view of a part of a curtain to which my fastener has been attached.

Fig. 4 is a central, vertical, sectional view of one of the members of the fastener.

Fig. 5 is a side elevation of a modified form of my improved fastener device, the eyelet member and the stud member being separated.

Fig. 6 is a view of the modification shown in Fig. 5, some of the parts being shown in section.

Fig. 7 is a side elevation of the stud member of my improved fastener showing another modification.

Fig. 8 is a view of the modified form shown in Fig. 7, partly in sectional elevation, as indicated by the dotted line 8—8 of Fig. 7.

Fig. 9 is a central, vertical, sectional view of the stud member of the fastener somewhat modified, showing means for securing same to a suitable support.

Fig. 10 is a central, vertical, sectional view of yet another modification of the invention.

Fig. 11 is a plan view of a portion of the structure of the modified form illustrated in Fig. 10.

Fig. 12 is a central vertical sectional view of yet another modified form of the stud member of the fastener.

Referring now to that form of the invention illustrated in Figs. 1 to 4 inclusive, the letter A represents an eyelet member as a whole, and B the stud member, as a whole, over which the eyelet member is adapted to be engaged. C represents a portion of the curtain to which the eyelet member A is attached, and D the portion of the curtain to which the stud member B is attached.

The eyelet member A comprises a circular, centrally apertured disk 1 and a second disk 2. The disk 2 is provided with a centrally arranged, tubular post or hub 3, the exterior diameter of which is such as to enable the apertured disk 1 to be placed over the hub 3. The curtain fabric C is apertured so that the hub 3 passes therethrough and then after the disk 1 is positioned upon the fabric C, said disks 1 and 2 are firmly secured together with the curtain C between them, by spreading the upper edge of the hub 3 over the margin of the central aperture in the disk 1, in a familiar manner.

The stud member B of the fastener comprises a centrally apertured circular disk 4 provided with a central raised hub 5 and a second disk 6 provided with a tubular extension or post 7. The disk 6 is provided with a central aperture within which the tubular part 5 of the disk 4 may enter. It will be observed by reference to Fig. 4 that the interior diameter of the tubular post 7 is greater than the exterior diameter of the tubular extension 5, thus providing an inwardly directed shoulder 8. 9 is a tapered mandrel or other suitable implement adapted to spread the upper end of the tubular post 5 as indicated at 10 in Fig. 2, whereby said upper end will engage over the inwardly directed shoulder 8 and lock the disks 4 and 6 together, the curtain section D having been first placed between them as shown. In the wall of the post 7, I provide one or more slots 11, preferably two, through which the curved portion 12 of a spring 13 may project. The spring 13 is made of a suitable piece of wire bent between its ends and in the preferred form, provided near each end with two bends 12, 12, so that the two bends 12, 12 will enter and project through the diametrically opposite slots or apertures 11, 11 of the post 7.

With the post member B permanently secured to the curtain D and the eyelet member A permanently secured to the curtain section C, it is easy to fasten the two curtain sections C and D together by simply pressing the eyelet member A over the stud 7. In this operation, the inner marginal edge of the disk 2 of the eyelet member will press against the curved portions 12 of the spring 13 which curved portions will yield sufficiently to enable the eyelet to pass the projecting parts of the spring and as soon as the disk member 2 is seated firmly upon the disk 6 of the post member, the spring 13 will resume its normal position, namely that shown in Fig. 2, with the bent portions 12 projecting through the apertures 11 and resting upon the ends of the eyelet member A.

Thus, while the spring arms 12 of the spring 13 will readily yield to enable the eyelet member to be pressed over the tubular post 7 and said spring ends, yet they will not yield when it is attempted to reverse the movement, and to withdraw the eyelet member from the post 7. Thus the two sections of the curtain are firmly secured together against accidental displacement and pressure of wind. However, the two members A and B may be readily separated by the operator by taking hold of the spring and pressing the two curved arms 12, 12 inwardly slightly. When this is done, it will be found that the curtain C with the eyelet member A may be readily withdrawn from the post 7 and away from the post member B.

In the modification shown in Figs. 7 and 8, I illustrate four slots 11, 11, arranged in pairs, and two springs 13, 13. The slots, 11, 11, in this instance, as well as the springs, are diametrically opposite each other. Where it is desirable to use the post members B in a machine or other places where eyelet members of different thicknesses may be used, then I prefer to have the post member B in the form shown in Figs. 7 and 8. In this instance, the inner spring 13 will accommodate an eyelet member A of one thickness while the outer spring 13 will hold the second eyelet member of the same thickness, or a single eyelet member of a different thickness. In other words, this modification affords some degree of adjustability by enabling me to use eyelet members of different thicknesses, or to secure more than one curtain, each having an eyelet member A attached thereto upon a single post member.

Where it is desirable that the post member B be secured not to a curtain member but to a suitable support, as for example, the metal body of a car, the wind shield, or a wooden portion of the car, I make use of the central aperture in the disk 4 of the member B as a means whereby, through the coöperation of a wood or metal screw, the member B may be united to the support. For example, in Fig. 9, I have shown the disk member 4 entirely omitted; the post 7, the disk member 6 and spring 13 only being used. A metal screw 14 passes through the central aperture in the disk 6, having its shoulder head resting upon the inturned flange 8, and is adapted to engage any suitable metal part of the machine. If this post member B is to be secured to a wooden part or support, then the screw 14 will be a wood screw instead of a metal screw or bolt. In some instances, I may dispense entirely with the screw 14, and secure the metal disk 6 or metal disk 4 of the member B directly to the metal of the vehicle or support by the familiar process of spot welding.

In the form shown in Figs. 5 and 6, the tubular post 7 which is open at its receiving end, is protected by an outer covering consisting of a tubular member 15 closed at the end 16 and provided in its walls with apertures 17 for the curved portions 12 of the spring 13. The eyelet member A coöperates with the cover member 15, precisely as described with reference to Figs. 1 and 4.

In Figs. 10 and 11, the post member B is made differently. The disk member 18 is provided with a central aperture 19 by which it may be secured to a suitable support. At diametrically opposite points, the disk 18 is provided with arms 20 which are bent inwardly and upwardly. Said arms are sufficiently resilient to form spring members 21 curved at 22 precisely as the spring 13 is curved. A tubular post or cap 23 is provided, adapted to fit over these arms 21. Suitable apertures 24 are provided for the curved parts 22 to project through. The end of the post or cap member 23 may be soldered or otherwise secured to the disk 18.

In the modified form shown in Fig. 12, a cap member similar to the member 23 is used, a base member 26 secured to the disk 18, and upwardly projecting spring arms 26ª are inside of the cap member, with their curved portions 27 projecting through slots 28 in the post 25. The base plate member 26 may be secured by a screw 29 to the support 30 or as before stated, this screw may be omitted in use, and the base disk 28, or the disk 18 in Fig. 11, or 4 of Fig. 4, may be spot welded or soldered to a metal support such as 30.

It will be noticed that in all of the forms of this invention, the main purpose is to have a tubular seat for an eyelet member with a yielding spring member projecting through slots and locking the eyelet member removably in place on its seat, and yet providing means whereby the spring member may be pressed inwardly by the operator so that the eyelet member may be readily removed from its seat.

I realize that modifications other than those shown herein may be made in the various details of the device, all of which I desire to have included within the scope of my invention; but my experience leads me to recommend the forms shown in Figs. 1 and 2 as a preferred construction.

I claim as my invention:

1. A curtain fastener comprising an apertured eyelet member and a stud member, the latter having an eyelet supporting shoulder flange and a tubular post, yielding locking means on the post at a distance from the shoulder flange equal to the thickness of the eyelet member, to be accessible to the operator when the eyelet and stud members are in locked relation, said locking means being frictionally held in position and having bearings at opposite sides of the slots through which the same projects.

2. A curtain fastener comprising a tubular stud member, an apertured eyelet member adapted to fit over the stud member, slots in the wall of the tubular stud diametrically opposite each other, and a wire bent between its ends into U-form, located within the stud, with a portion of each end projecting somewhat through one of said slots and engaging the end walls of said slots and adapted to yieldingly engage the eyelet member.

3. A curtain fastener comprising an eyelet and a stud member, the eyelet member being adapted to be secured to a curtain section and being provided with a stud receiving aperture, the stud member being provided with a tubular post member with a laterally extending opening in its wall and with a spring locking device partially projecting through the wall opening and engaging the opposite end walls of said opening whereby it may be engaged by the eyelet member when the latter is positioned over the post, and means for securing the stud member to a curtain section or other support.

4. A curtain fastener comprising an eyelet and a stud member, the eyelet member having a central aperture, a disk and a second disk whereby a curtain section may be clamped between the said disks, the stud member having a tubular post and a laterally extending flange having an aperture of less diameter than the interior diameter of the post to form an interior shoulder in said post, a plate provided with a tubular rivet projecting therefrom adapted to enter the flange aperture and be secured to the said shoulder whereby said plate and post flange may be united with a curtain section clamped between them, an aperture in the wall of the tubular post, and a spring member in the post having a portion extending through the post wall aperture to rest upon the eyelet washer when the eyelet member has been positioned over the post member whereby said post and eyelet members are yieldingly united.

In testimony that I claim the foregoing as my invention I affix my signature in the presence of two witnesses, this 7th day of June, A. D. 1919.

HARRY KERN TARKINGTON.

Witnesses:
P. A. HAURON,
JAY DEWEY.